United States Patent
Dockter et al.

(10) Patent No.: US 6,269,906 B1
(45) Date of Patent: Aug. 7, 2001

(54) TWIST LOCK HOLDER OR STEP

(75) Inventors: Donald D. Dockter; Philip D. Bogner, both of Bismarck, ND (US)

(73) Assignee: Clark Equipment Company, Woodcliff Lake, NJ (US)

(*) Notice: Subject to any disclaimer, the term of this patent is extended or adjusted under 35 U.S.C. 154(b) by 0 days.

(21) Appl. No.: 09/388,506

(22) Filed: Sep. 2, 1999

(51) Int. Cl.$^7$ .................................................. E06C 9/00
(52) U.S. Cl. .................... 182/92; 248/272.51; 248/243
(58) Field of Search ...................... 182/92, 90; 248/243, 248/223.31, 222.51

(56) References Cited

U.S. PATENT DOCUMENTS

| | | | |
|---|---|---|---|
| 1,335,553 | * | 3/1920 | Brachtz ............................ 248/222.52 |
| 1,657,939 | * | 1/1928 | Rockwell ............................... 248/243 |
| 2,667,322 | * | 1/1954 | Ullberg ................................. 248/243 |
| 3,833,090 | | 9/1974 | Georgianna ............................. 182/92 |
| 3,930,562 | | 1/1976 | Zorn ........................................ 182/92 |
| 3,974,615 | | 8/1976 | Ditcher ..................................... 52/698 |
| 4,193,649 | * | 3/1980 | Sharon . |
| 4,382,416 | | 5/1983 | Kellogg-Smith ........................ 114/90 |
| 4,434,960 | * | 3/1984 | Berry ................................ 248/223.31 |
| 4,605,098 | | 8/1986 | Leuty ...................................... 182/92 |

FOREIGN PATENT DOCUMENTS

954943 * 4/1964 (GB) .................................... 248/243

* cited by examiner

*Primary Examiner*—Alvin Chin-Shue
(74) *Attorney, Agent, or Firm*—Westman, Champlin & Kelly, P.A.

(57) ABSTRACT

A step is attachable to a mounting wall without the use of tools. The step has latching T-tabs at outer ends of legs formed into a V shape. The latching T-tab of a lower leg can be twist locked into a formed slot by inserting the lower leg through the lock slot in one position and rotating it to a working position. The second leg forms a step surface and is latched to the supporting wall after the first leg is rotated to locking position.

6 Claims, 7 Drawing Sheets

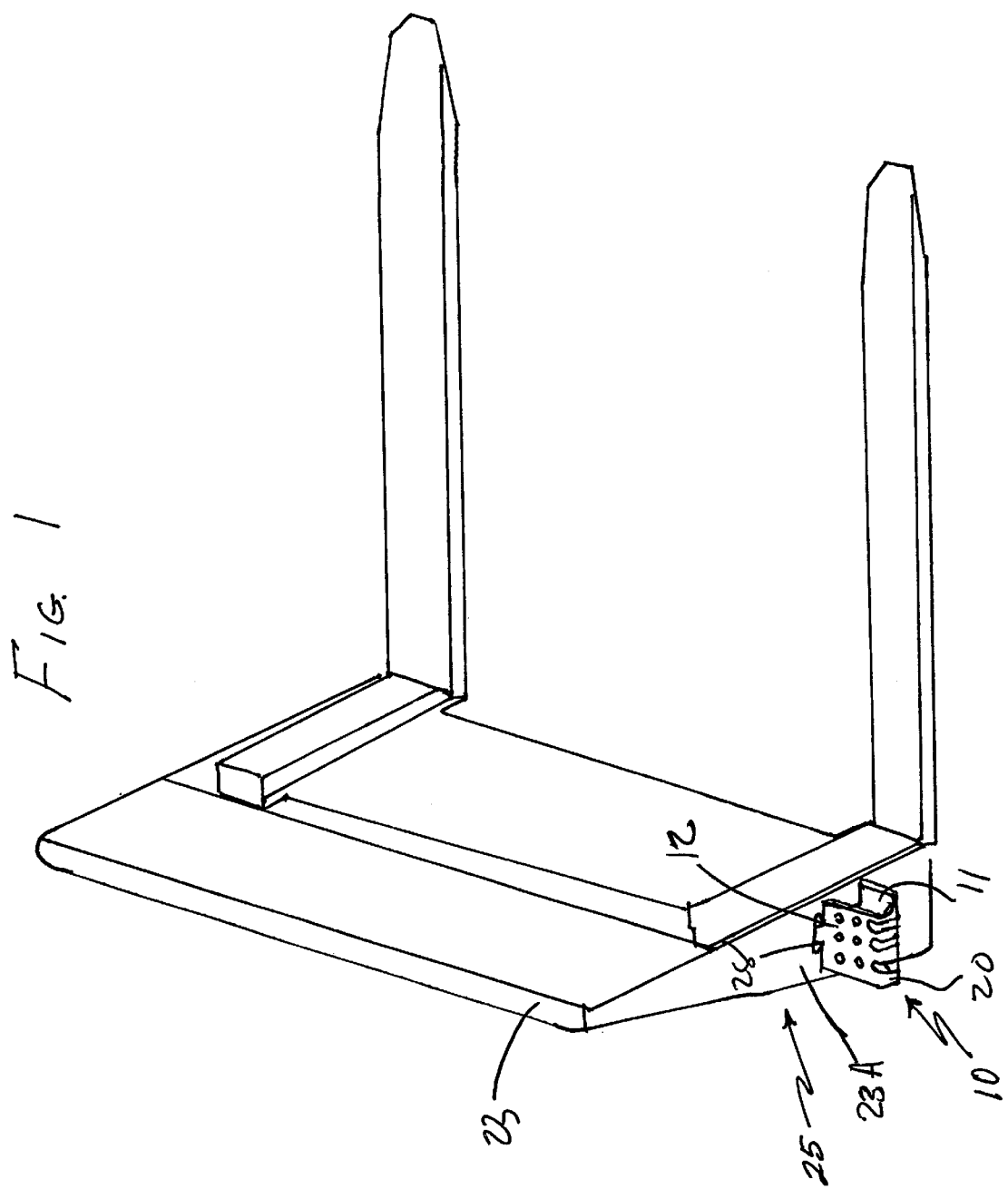

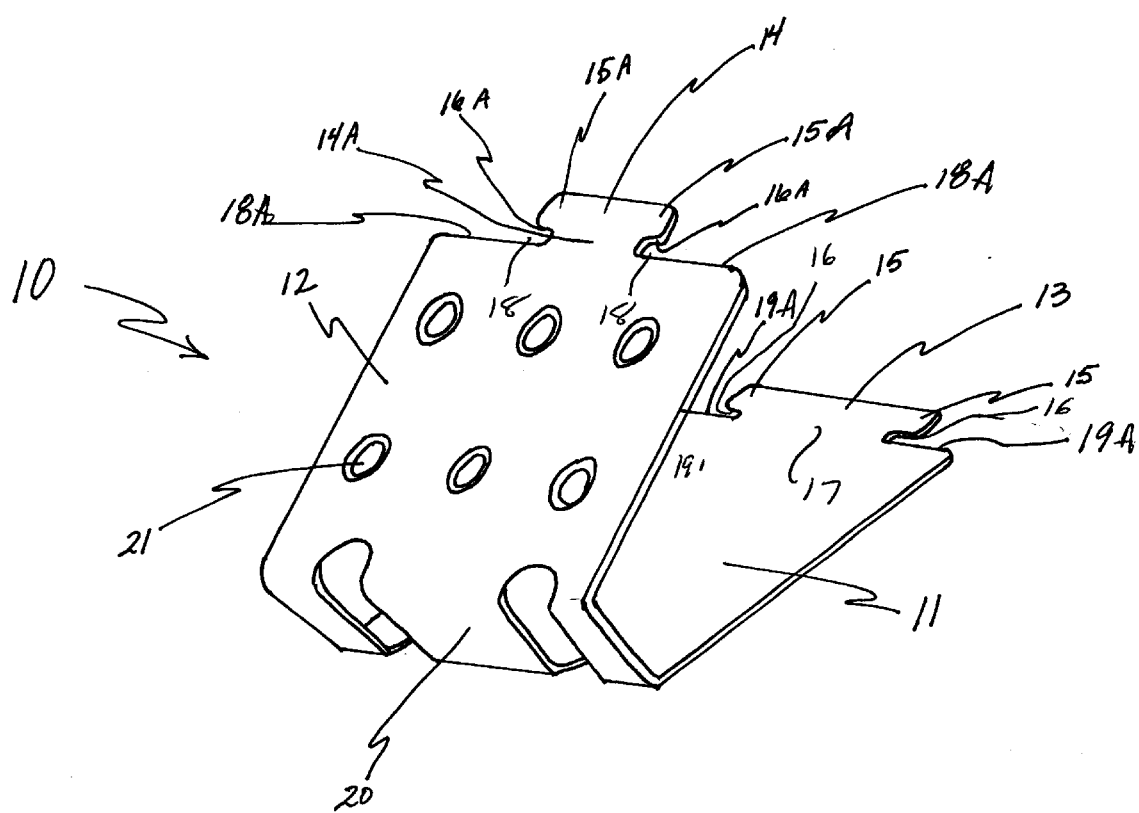

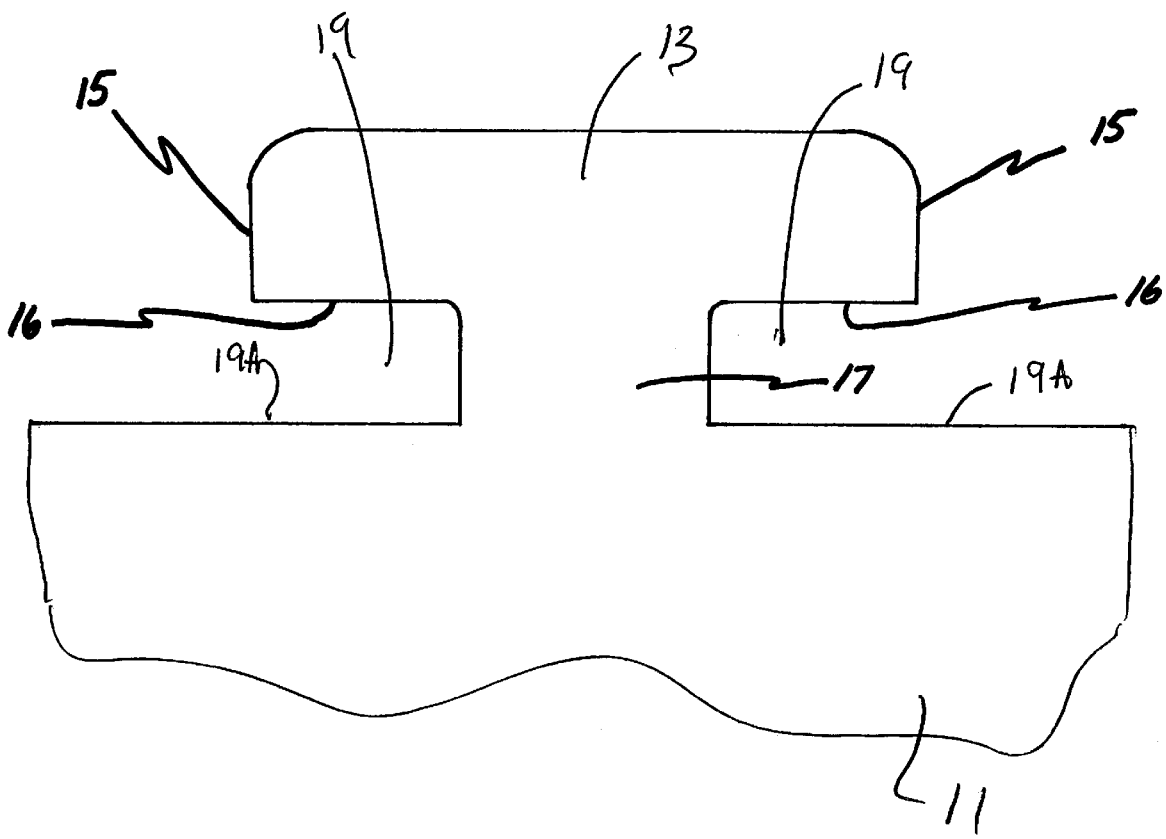

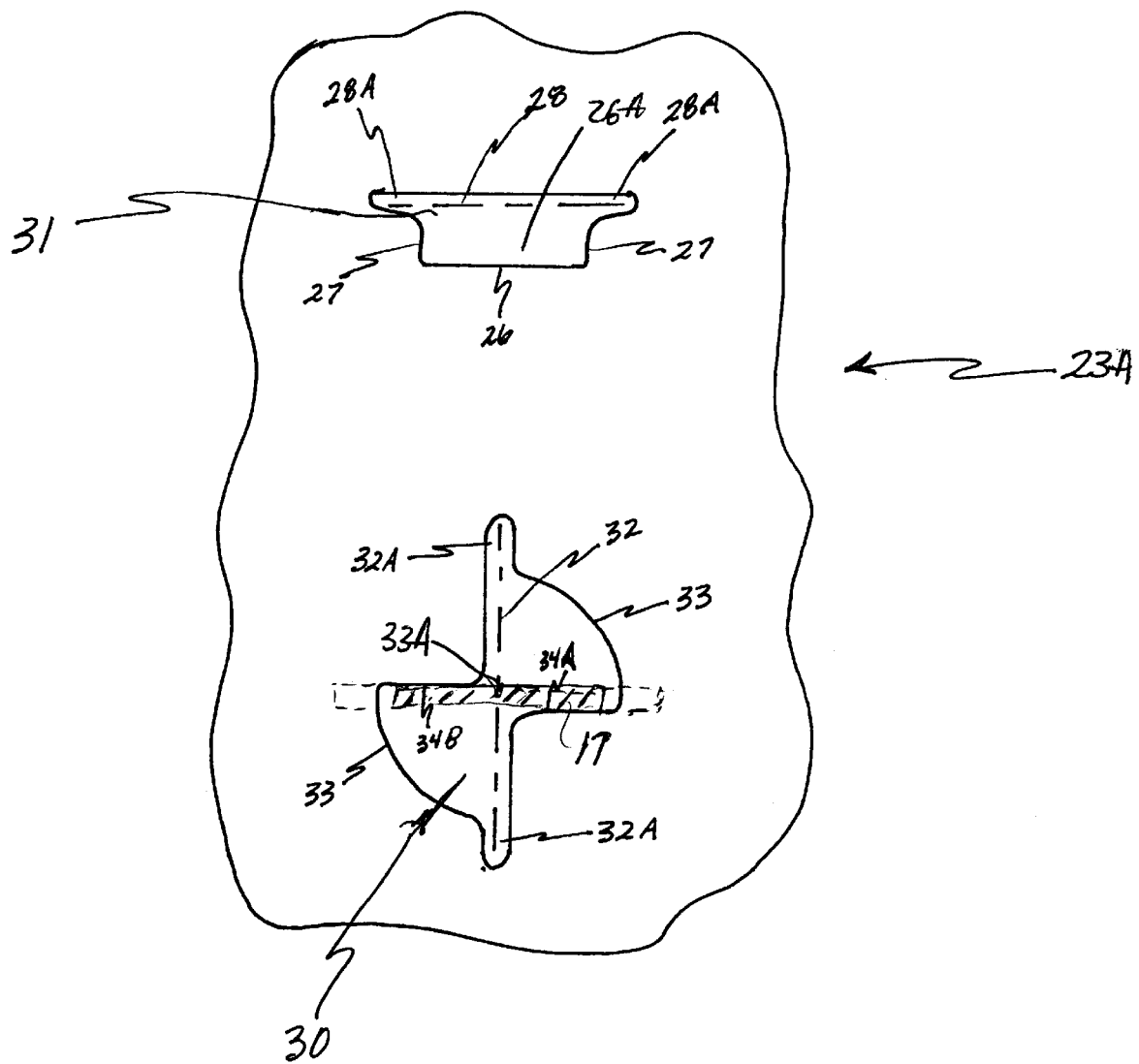

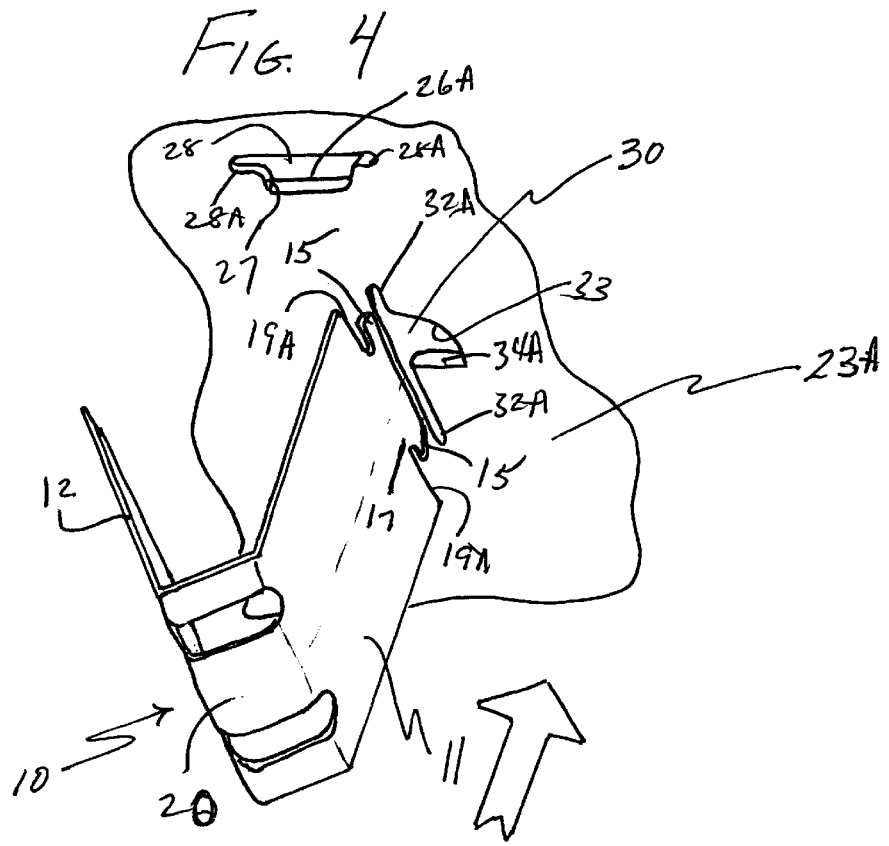
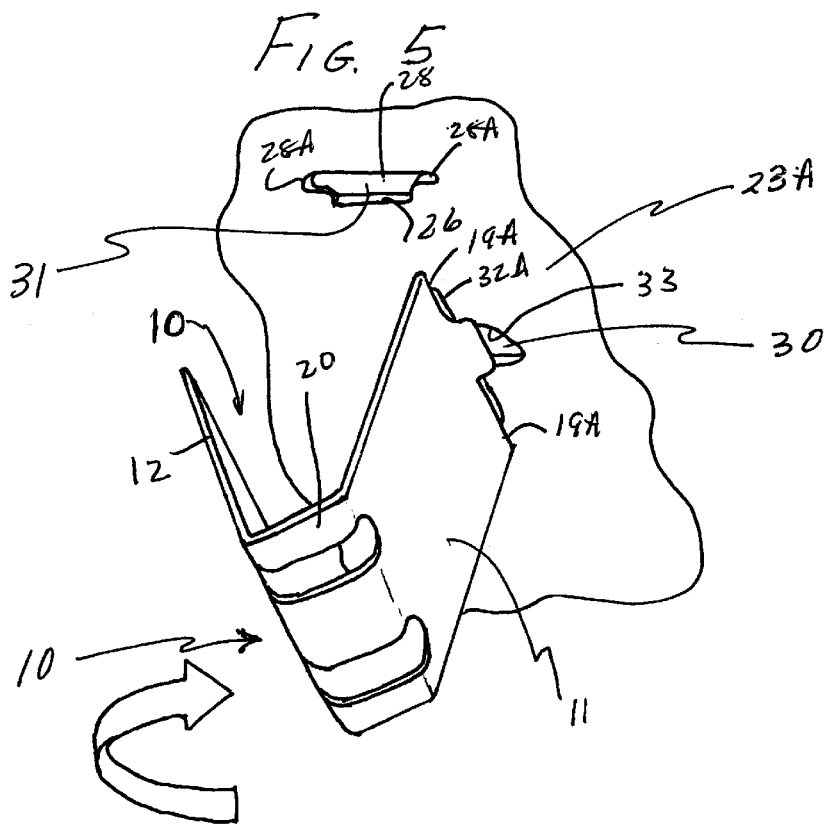

TWIST LOCK HOLDER OR STEP

BACKGROUND OF THE INVENTION

The invention relates to a quick mounting step or support that can be installed and removed without the use of tools or fasteners.

Most steps and brackets require the use of tools for installation and/or fasteners for attaching. The use of tools or fasteners for installation purposes can, in many circumstances, be cumbersome, time-consuming or nearly impossible due to space restrictions. A step that can be mounted without tools or other fasteners has an advantage because it avoids such problems and increases efficiency as well as versatility.

SUMMARY OF THE INVENTION

The present invention relates to a step or support that can be used in applications such as an implement step, or a support bracket for mounting other parts. No tools or fasteners are required for attaching the step or support (referred to as a step hereafter) to a mounting wall. The step may be removed by hand or installed in another location by hand for another application. Installation and removal by hand and without tools aids in the easy and quick repositioning of the step.

The step of the present invention as shown is generally V-shaped with two diverging legs. The angle between the legs and length of the legs are selected so when installed on a vertical wall surface, one leg is horizontal to form a step surface or a support surface, and the other leg extends to form a brace. Installation of the step requires a mounting wall that has at least one specially designed hole to receive a tab at the end of one of the legs for attaching to the mounting wall through the hole and locking it in place by twisting the step about an axis perpendicular to the wall. Preferably, as shown in an exemplary form, both legs have tabs, shown as T-tabs, at their ends. The step can mount anywhere a pair of patterned holes is cut in a mounting or support wall of prescribed thickness for the given T-tab design and there is clearance behind the mounting wall for the T-tabs.

The step is installed as shown by orienting the step so that a T-tab of one (lower) leg of the step is aligned with the long axis of a first associated slot in the mounting wall, as shown. The tab is inserted into one of the two holes cut in the mounting wall and the entire step is rotated until the first end of the second leg is aligned with a second slot or hole. The rotation is sufficient so the T-tab of the one leg is locked to the mounting wall. Next, the second (upper) leg of the step is moved relative to the one leg to a position where the T-tab attached to the upper leg can be inserted into the second hole in the mounting wall. The second or upper hole is spaced from the first hole so the legs are under spring load when the other leg is inserted. The V shape provides a spring load resisting separation of the legs and tends to move the ends of the legs back to their rest position. Once the T-tab of the second leg is inserted, the leg can be released and the spring force tending to move the legs back to their original position causes the T-tab to lock into the second hole of the mounting wall.

Various types of tabs can be used, and the upper leg can be secured to the mounting wall with other fasteners, if desired. The tabs on both legs make installation and removal simple and easy.

Although the step can be removed or installed by hand, once installed, the step is held securely to resist loading from all directions, and cannot be removed or dislocated with normal use. However, the step can be removed by reversing the installation process. Depending on the design and material properties of the step, varying amounts of force will be required to install or remove the step.

BRIEF DESCRIPTION OF THE DRAWINGS

FIG. 1 is an illustration of a pallet fork having a step made according to the present invention installed thereon;

FIG. 2A is an isometric view of the step shown in FIG. 1;

FIG. 2B is an enlarged fragmentary plan view of an end of a step leg showing a latch T-tab used therewith;

FIG. 3 is a front view of the wall on which a step will be mounted with holes cut in a pattern for attaching the step of FIG. 1;

FIG. 4 is a perspective view showing the step in a position ready for insertion into holes in the mounting wall;

FIG. 5 shows the step inserted into the mounting wall, before rotation to latch the step in position;

DETAILED DESCRIPTION OF THE ILLUSTRATIVE EMBODIMENTS

Figure 6:
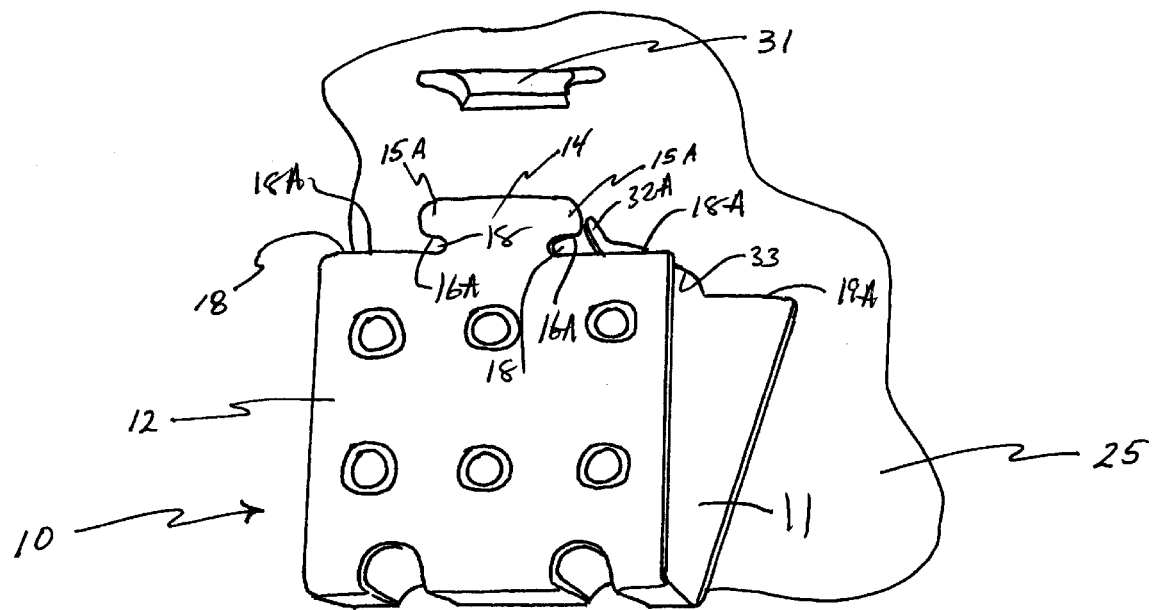
FIG. 6 illustrates a step with a lower leg latched in position, ready for insertion of the top leg into a latch slot.

FIG. 1 shows an application of the invention as a step or support 10 on a pallet fork 25. The side of the pallet fork frame 23 has a side wall that is used as the mounting wall 23A illustrated in FIGS. 1 and 3 and the details of features and installation of step 10 are as illustrated in FIGS. 2 and 4–8. The pallet fork is but one of the attachments on which the step or support 10 can be mounted. For example, the quickly installed and removable step can be used on a backhoe frame wall or plate. The step can be installed for reaching a component for adjustment, for example, and then removed for the use of the attachment.

FIGS. 2A and 2B show step 10 in greater detail. The step is preferably formed into a V shape with planar legs 11 and 12 and a connecting bend or elbow 20 at first ends of the legs. Lower leg 11 has a T-tab 13 at the second end of the leg, including a stem 17 formed by notches 19 extending inwardly from the side edges of the planar leg 11. The notches 19 define the shoulder surfaces 19 that will carry compression loads to the mounting wall 23A. T-tab 13 includes flanges 15 that have shoulders 16 on the opposite side of a stem 17. The shoulders 16 face shoulders 19A and when installed, face the back of mounting wall 23A and will keep the leg 11 from being pulled away from the wall 23A once it has been twist locked in place. The shoulders 19A are wider than shoulders 16A, so the flanges 15 are not as wide as the leg to which it is attached.

Upper leg 12, which forms a step surface, has a T-tab 14 connected to leg 12 with a stem 14A formed by notches 18 that form shoulder surfaces 16A and 18A.

The flanges 15A of the T-tab 14 terminate inwardly from the side edges of leg 12 so shoulders 18A are wider than flanges 15A and shoulders 16A.

An array of holes 21 on leg 12 form a grip when step 10 is being used. If step 10 is being used as a support for mounting other items, the holes 21 can be used for bolts to clamp supported parts in place. The bend or elbow 20 connecting legs 11 and 12 has a preformed shape that acts as a spring, and force is required to spread the outer ends of legs 11 and 12 apart or compress them together from a rest position. The spring load of the step legs is used to advantage to lock step 10 to a mounting wall as will be explained. The legs 11 and 12 tend to return to their original position under spring load. However, the step can be a regular steel plate and does not have to be spring steel.

As shown fragmentarily in FIG. 3, mounting wall 23A has irregularly formed latch holes 30 and 31. Hole 30 is also called a twist lock slot, and has a slot portion 32, indicated by a center dashed line, having opposite end portions 32A sized for inserting the flanges 15 of T-tab 13 of leg 11. Hole 30 is symmetrical about its center dividing plane, as shown, and has radius edge cuts 33 that will fit into or be received in notches or recesses 19 of leg 11 of the step with shoulder 16 of T-tab 13 on the opposite side of mounting wall 23A from leg 11.

The T-tab 13 of step leg 11 is inserted with the plane of the leg parallel to the axis of slot 32 (as shown vertical) and then the leg 11 is twisted or rotated so it comes to a resting position with the stem 17 held from further rotation by edge surfaces 34A and 34B of hole 30. The lower surface of stem 17 on one side of the step center plane contacts edge surface 34A and the upper surface of stem 17 on the other side of the step center plane contacts edge surface 34B. The flanges 15 of the T-tab 13 are then held behind the wall 23 beyond the outer ends of surface 34A and 34B to secure the leg 11 in position. The shoulders 19A will bear against the outer surface of wall 23A at locations beyond the ends of surface 34A and 34B to carry compression loads on leg 11.

An upper hole 31 in vertical registry with hole 30 includes a slot 28 with end portions 28A that receive flanges 15A for inserting T-tab 14 of leg 12 when the T-tab is aligned with the slot. The end portions 28A extend out from a lock notch 26A that has a lower surface 26 and side edge surface 27. The lock notch leaves wall portions that extend into the side notches 18 forming T-tab 13. The shoulders 16A will engage the back side of walls 23 so that the T-tab 14 cannot pull horizontally out of the notch. T-tab 14 is then held in a locked position unless the T-tab 14 is released. The axis of slot 32 is at an angle (as shown 90°) relative to the axis of slot 28, so it can be seen that in order to insert T-tab 14 into slot 28, after inserting T-tab 13 into slot 32, the step has to be rotated 90°. The axis of slot 32A could be at 45° or less relative to slot 28, so long as the leg 11 can be twist locked in place with the tab 15 behind wall 23A in the region defined by the wall adjacent at least one edge 33. As long as one flange 15 is locked in place, the twist lock will work. Thus, the surface 34B can be eliminated if the leg 11 is made narrow (divided along its longitudinal center plane) and will rotate in the hole 30 for locking.

FIG. 4 is a view of the initial position of the step when mounting the step 10 to mounting wall 23A. FIG. 4 shows step 10 rotated so the plane of leg 11 is vertical and parallel to the axis of slot 32. In this position, T-tab 13 is facing mounting wall 23A in a vertical position. Mounting wall 23A is oriented with hole 30 below hole 31. T-tab 13 is inserted into slot 32 of hole 30 until the surfaces 19A of leg 11 makes contact with wall 23A. With T-tab 13 inserted into hole 30, FIG. 5 illustrates step 10 being rotated clockwise. The edges 33 pass into notches 19, so two portions of the wall 23A are between shoulders 16 and 19A, thereby preventing the leg 11 from being pulled away from wall 23A.

Step 10 is rotated until stem 17 of T-tab 13 makes contact with and is stopped by mating edge surfaces 34A and 34B of the mounting wall. The space between the inner ends of surfaces 34A and 34B is less than the width of stem 17. The shoulders 19A now engage the wall 23A to the outside of both sides of the hole 30 so the leg 11 will react loads that load the leg 11 of step 10 toward wall 23A.

Figure 7:
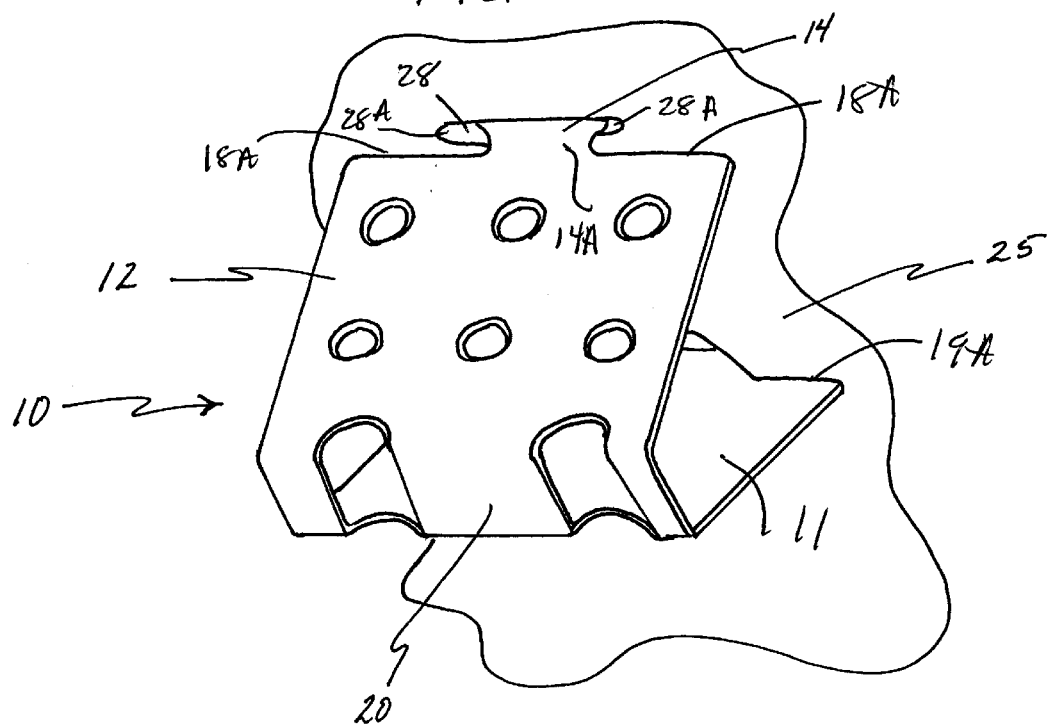
FIG. 7 shows the T-tab on the upper leg of the step inserted into the mounting wall and locked into position.
Figure 8:
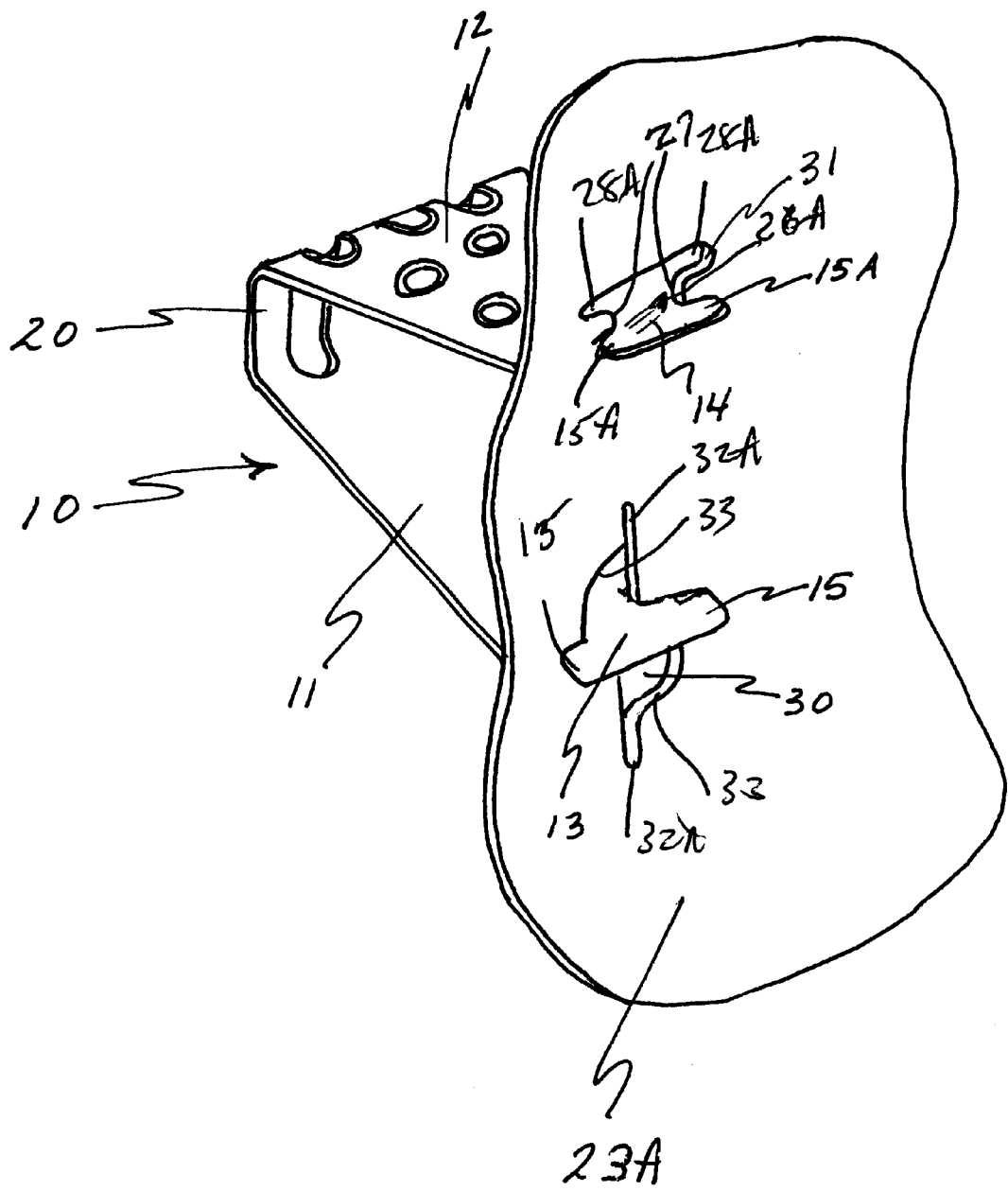
FIG. 8 is a rear view of the mounting wall with both T-tabs of the step securely mounted to the wall.

FIG. 6 shows the position of step 10 so the T-tab 14 of upper leg 12 aligns with the slot ends 28A of hole 31. The plane of leg 12 is generally horizontal and parallel to the axis of slot 28. As shown, this rotation is D90°, but the angle between slots 28 and 32 can be different. The leg 11 is locked in place to prevent substantial movement toward or away from the mounting wall 23A, but the clearance permits the step to pivot so elbow 20 can move up and down. The spacing between the slots 32 and 28 is selected relative to the spacing between the full ends of legs 11 and 12 so that in order to insert T-tab 14 into slot 28 of hole 31, leg 12 must be moved from its rest position, as shown, lifted vertically (away from leg 11) against the resistance or spring load of elbow region 20 of step 10. In FIG. 6, T-tab 14 is ready to be inserted into slot 28 and the step has been rotated so surface 34B will restrain leg 11 from lifting. The second or outer end of leg 12 is then lifted until T-tab 14 can slide into slot 28. FIG. 7 shows T-tab 14 inserted into slot 28 of hole 31 with flange 15A passed through slot ends 28A. The force used to spread legs 11 and 12 apart so the tab can be inserted is now released. T-tab 14 springs toward surface 26 of hole 31 under the spring force of elbow 20 until stem 17A seats in notch 26A and contacts surface 26 and T-tab 14 is locked into place. FIG. 8 shows a rear view of mounting wall 23A after step 10 is attached to and locked in place on the mounting wall. The flanges 15A keep step leg 12 held on the wall 23A when a load is applied to leg 12. The shoulder 16A will contact the back surface of the wall 23 adjacent but outward from the edges 27 of notch 26A.

In this configuration, step 10 is rigidly securely attached and restricted from substantial motion in all directions. Step 10 is restricted from horizontal and downward movement because stem 17A of T-tab 14 contacts with surface 26 of notch 26A and the surface 27 prevents side to side movement. Leg 11 is restricted from all vertical motion because the upper and lower surfaces of stem 17 of T-tab 13 on opposite sides contact mating surfaces 34A and 34B of hole 30. Shoulders 19A bear against the wall 23A when a load is placed on step 11. Step 11 will carry downward loads for supporting a person.

All upward vertical motion of T-tab 14 could be prevented if a fastener, wedge or some other movement restricting object was applied to hold T-tab 14 in position after the mounting of step 10 is complete. However, to release the step, leg 12 is lifted to permit flanges 15A to be pulled out of slot 28, the step twisted to unlock T-tab 13 for removal.

Axial motion of leg 11 that is along the plane of the leg, is restricted to the space between flanges 15A of T-tab 14, defined by shoulder surfaces 18A and 16A and the space between shoulder surface 16 of T-tab 13 and shoulder surface 19A which captures mounting wall 23A. Once the mounting wall is captured, axial motion of step 10 is eliminated. Rotational motion is also restricted after T-tab 14 is locked into place. Given sufficient spring loading in the materials of step 10, the contact of T-tab 14 with surface 26 will prohibit rotational motion as long as motion in the other directions is restricted.

Only one flange 15 or 15A can be used and will work the same as two flanges as long as the leg 11 can rotate for twist locking. Also, as stated, the angle of the longitudinal axes of slots 32 and 28 can be substantially less than 90°, as long as the rotation of the step will lock the T-tab 13 onto the wall.

The step 10 can be removed by reversing the procedure described in FIGS. 4–8, again without using tools, since there are no fasteners.

Although the present invention has been described with reference to preferred embodiments, workers skilled in the art will recognize that changes may be made in form and detail without departing from the spirit and scope of the invention.

What is claimed is:

1. A twist lock step in combination with an implement attachment mounting wall for supporting a person comprising:

first and second legs joined at first ends thereof and resiliently urged to a rest position in a generally V shape;

a first lock tab at a second end of the first leg having a first flange forming a first shoulder facing the first end of the first leg;

a second lock tab at a second end of the second leg having a second flange forming a second shoulder facing the first end of the second leg;

the first lock tab being insertable through a first slot of a mounting wall of an implement attachment and movable in a twisting movement to lock the first shoulder on an opposite side of the mounting wall from the first leg and the second lock tab being movable, sequentially to a second slot to lock the second shoulder on an opposite side of the mounting wall, the mounting wall of the implement attachment having the first slot oriented along a first axis to receive the first flange of the first leg and to permit the first leg to rotate for the twisting movement with the first shoulder of the first leg on the opposite side of the mounting wall from the first leg, and the second slot extending at a different angle from the first slot to receive the second flange of the second leg with the first leg rotated to a desired position and the second leg moved relative to the first leg against the resilient urging, and further comprising the first slot being formed in a pattern with a slot periphery cut extending to provide a clearance opening extending laterally from adjacent a first end of the slot, the clearance opening having a clearance radius less than a radius of an outer side edge of the first flange from a central axis of the first leg to capture the first shoulder of the first flange behind the mounting wall when the first leg is rotated; and a surface joining the slot periphery cut and extending toward an axis of the clearance radius for contacting the stem supporting the first flange on the first leg after rotation of the first leg to a position where the second lock tab of the second leg can be inserted into the second slot.

2. The twist lock step of claim 1, wherein the flanges are formed by notches extending inwardly from a side edge of each leg, at least one of the legs having a width greater than the flange on the at least one leg to form a shoulder facing the mounting wall that extends laterally a greater amount than the flange.

3. The twist lock step of claim 1, wherein the legs of the step are planar.

4. The twist lock step of claim 1, wherein the second slot positions the second leg to be under a spring load relative to the first leg when the second leg flange shoulder is on the opposite side of the wall from the second leg.

5. The twist lock step of claim 4, wherein the second slot for receiving the second leg lock tab, comprises:

a recessed notch forming a wall portion for retaining the flange shoulder of the inserted lock tab and having a surface for supporting the second leg and resisting the spring load.

6. A twist lock step in combination with a mounting wall, comprising:

a generally V-shaped step having first and second legs joined at first ends and the legs having side edges extending to second ends the legs being spring-loaded when moved from a rest position;

a first lock tab at a second end of the first leg formed by a recess extending inwardly from both side edges and forming facing shoulders on each side of a stem joining the first lock tab to the first leg;

the shoulders at the second end of the first leg being oriented to permit inserting the second end in a generally vertical elongated opening of the mounting wall and twist locking the first leg in such opening to orient the second leg generally horizontal;

a second lock tab on the second leg insertable through a generally horizontal slot of the mounting wall for latching the second leg when the first leg is twist locked in the opening of the mounting wall, the second lock tab being insertable by moving the first and second legs relative to each other from the rest position and locking the second lock tab in place in the horizontal slot by the spring loading urging the first and second legs to a rest position;

the vertically elongated opening for the first leg including a slot oriented along a first vertical axis to receive the first lock tab, the slot having slot clearance openings on opposite sides of the vertically elongated opening configured to permit the first leg to be rotated about a central axis to cause the shoulders to receive first edge portions, of the wall defining the slot clearance openings, the slot clearance openings having a first and second horizontally extending portions on opposite side of said vertical axis, respectively, the first horizontally extending portion for supporting the stem of the first leg above the stem on one side of the slot and the second horizontally extending portion supporting the stem of the first leg below the stem on the other side of the slot when the first leg is rotated and twist locked in the slot clearance openings.

* * * * *